United States Patent [19]

Sasao et al.

[11] Patent Number: 5,653,603
[45] Date of Patent: Aug. 5, 1997

[54] CARD EJECT MECHANISM FOR CARD-RECEIVING CONNECTOR

[75] Inventors: Masami Sasao; Hideyuki Hirata, both of Yokohama, Japan

[73] Assignee: Molex Incorporated, Lisle, Ill.

[21] Appl. No.: 534,225

[22] Filed: Sep. 26, 1995

[30] Foreign Application Priority Data

Oct. 6, 1994 [JP] Japan ................... 6-268432

[51] Int. Cl.$^6$ ................................. H01R 13/62
[52] U.S. Cl. ................................. 439/159
[58] Field of Search .................. 439/152, 159–160

[56] References Cited

U.S. PATENT DOCUMENTS

| 5,443,395 | 8/1995 | Wang | 439/159 |
| 5,507,658 | 4/1996 | Ho | 439/159 |

FOREIGN PATENT DOCUMENTS

| 0532346 | 9/1992 | European Pat. Off. | H01R 23/68 |

Primary Examiner—David L. Pirlot
Assistant Examiner—Brian J. Biggi
Attorney, Agent, or Firm—Stacey E. Caldwell

[57] ABSTRACT

An eject mechanism for a card-receiving connector equipped with a foldable eject button which provides sufficient mechanical ejection stroke without excess projection of the ejection button from a front face of an electronic apparatus. The card ejection mechanism includes an eject rod, an eject button connected to the ejection rod, and an actuation lever for ejecting a memory card from the card-receiving connector. The eject button includes a base button and an operation button. The operation button is pivotally connected to the base button and is mounted for movement between a raised position where the operation button is axially aligned with base button, and a folded position where the operation button is oriented generally perpendicular to the base button. The operation button includes a base portion for engaging a corresponding recess in the base button for holding the operation button in its raised position.

8 Claims, 7 Drawing Sheets

CARD EJECT MECHANISM FOR CARD-RECEIVING CONNECTOR

FIELD OF THE INVENTION

The present invention relates generally to a card-receiving connector for receiving an IC or memory card and, more specifically, to a card eject mechanism equipped with a foldable push-rod which provides a mechanically effective ejection of a card and at the same time is space-efficient.

DESCRIPTION OF THE RELATED ART

A card-receiving connector has been employed for receiving a card, such as an IC or memory card or the like, in an electronic apparatus, such as a notebook or hand-held personal computer. Such card-receiving connectors generally comprise header connectors for electrically connecting the card to the underlying electronic apparatus and an eject mechanism for ejecting the card from the card-receiving connector.

The eject mechanism typically includes an eject button, an eject rod integral with and extending from the eject button, and an actuation lever associated with an end of the eject rod opposite the eject button for ejecting the card. When force is applied to the eject button, the actuation lever is actuated by way of the eject rod and pushes out the card to allow removal thereof.

To eject the IC card efficiently and smoothly from the heads connector, a minimal stroke or travel of the eject button is required. To provide such stroke for the eject button, the eject button must project a minimal distance from the front face of the card-receiving connector. However, projection of the ejection button may interfere with use or carriage of the electronic apparatus. As a solution for such problems, foldable eject buttons have been employed. By employing foldable eject buttons, it is possible to obtain sufficient stroke or travel during the ejection of the card by positioning the eject button in alignment with the eject rod, and to minimize the projection of the eject button in the non-ejecting state by "folding down" the eject button. Such a foldable eject button employed in card ejection mechanisms is disclosed in U.S. Pat. No. 5,443,395.

In the prior art set forth above, in order to pivotally maintain the eject button and to assure accurate stroke of the eject button without causing movement of the button relative to the rod, a specially molded eject rod is required. A specially molded eject rod limits the material from which the rod can be fabricated and therefore limits applications and certain processes available in which to use the design.

SUMMARY OF THE INVENTION

It is an object of the present invention to provide an improved card eject mechanism for a card-receiving connector which provides sufficient ejection stroke without excess projection of the eject button from the card-receiving connector.

Another object of the invention is to provide a card eject mechanism for a card-receiving connector which permits design variation and simplification of the card-receiving connector.

According to one aspect of the invention, a card eject mechanism for a card-receiving connector includes an eject button, an eject rod connected to the eject button, and an actuation piece operatively associated with an end of the eject rod for ejecting a card from the connector, wherein the eject button is constructed of a base button and an operation button, and the operation button is pivotally connected to the base button for movement between a raised position where the operation button is axially aligned with the base button and a folded position where the operation button is oriented generally perpendicular to the base button; the operation button further includes a base portion, wherein the base button includes a recess for engaging the base portion of the operation button when the operation button is in the raised position.

The base button of the eject button may include with a lock arm for fixing the operation button in the folded and raised positions.

According to another aspect of the invention, a card eject mechanism for a card-receiving connector comprises:

an actuation lever for ejecting the card from the connector;

an eject rod operatively associated with the actuation lever;

an eject button assembly cooperating with the eject rod for transmitting force to the eject rod during ejection of the card, the eject button assembly including a first member fixed to the eject rod and in alignment therewith, and a second member pivotable relative to the first member between an active position for permitting application and transmission of an ejecting force, and a resting position for avoiding inadvertent ejection of the card; and means on the first member of the eject button assembly for holding the second member in the active position.

In the preferred construction, the first and second members are pivotally connected through a mechanism which permits pivotal movement of the second member relative to the first member and further permits axial movement of the second member relative to the first member. In the construction, the holding means comprises first means active when the second member is in the active position and axially moved toward the first member for establishing interengagement between the first and second member during ejection of the card such that the member function as an integral button assembly. Also, the holding means further comprises a second means active when the second member is in the resting position for restricting pivotal motion of the second member.

The card eject mechanism may further comprise a locking mechanism for locking the second member in the resting position. In such case, the locking mechanism may also lock the second member in the active position.

BRIEF DESCRIPTION OF THE DRAWINGS

The present invention will be understood more fully from the detailed description given herebelow and from the accompanying drawings of the preferred embodiment of the invention, which, however, should not be taken to limit the present invention, but are for explanation and understanding only.

DESCRIPTION OF THE PREFERRED EMBODIMENT

The present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessarily obscuring the invention.

As shown in FIGS. 1 to 4, a card eject mechanism for a card-receiving connector generally includes an eject button 1, an eject rod 2 integral with the eject button 1 and an actuation lever (not shown) operatively associated with an end portion of eject rod 2 for ejecting the card from a header connector (not shown).

Figure 1:
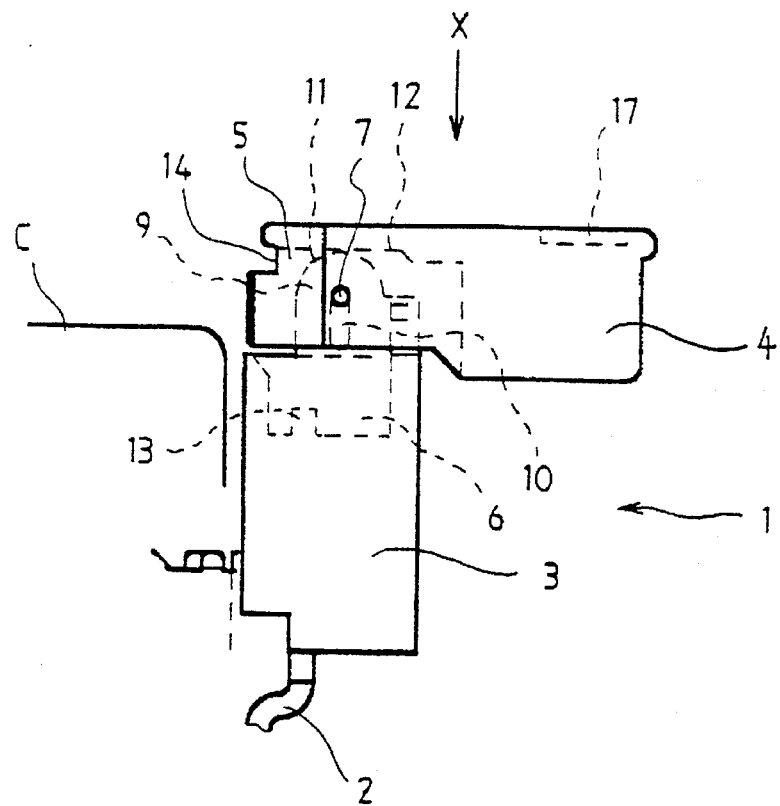
FIG. 1 is a front elevation view showing the preferred embodiment of a card eject mechanism according to the present invention, in which an eject button is illustrated in a folded position.
Figure 2:
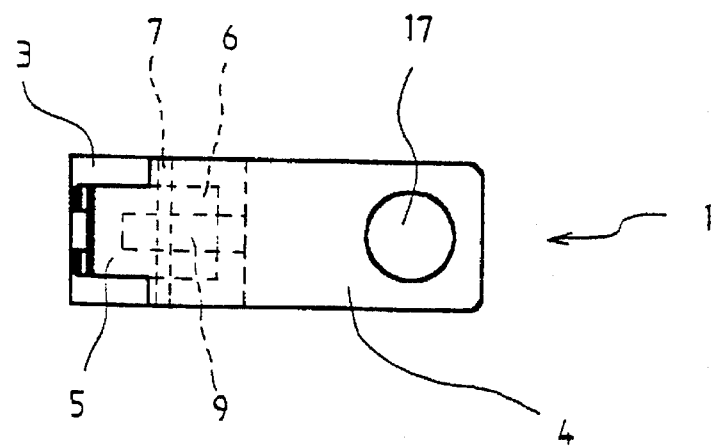
FIG. 2 is an illustration of the preferred embodiment of the card eject mechanism as viewed in the direction of arrow X in FIG. 1.

The eject button 1 comprises a base button 3 and an operation button 4. Operation button 4 is pivotally connected to base button 3. Therefore, operation button 4 is mounted for pivotal movement between a raised position where it is in axial alignment with base button 3 (FIG. 3) and a folded position where it extends generally perpendicular to base button 3 (FIG. 1). Base button 3 is integrally connected with eject rod 2 for example by overmolding.

Figure 3:
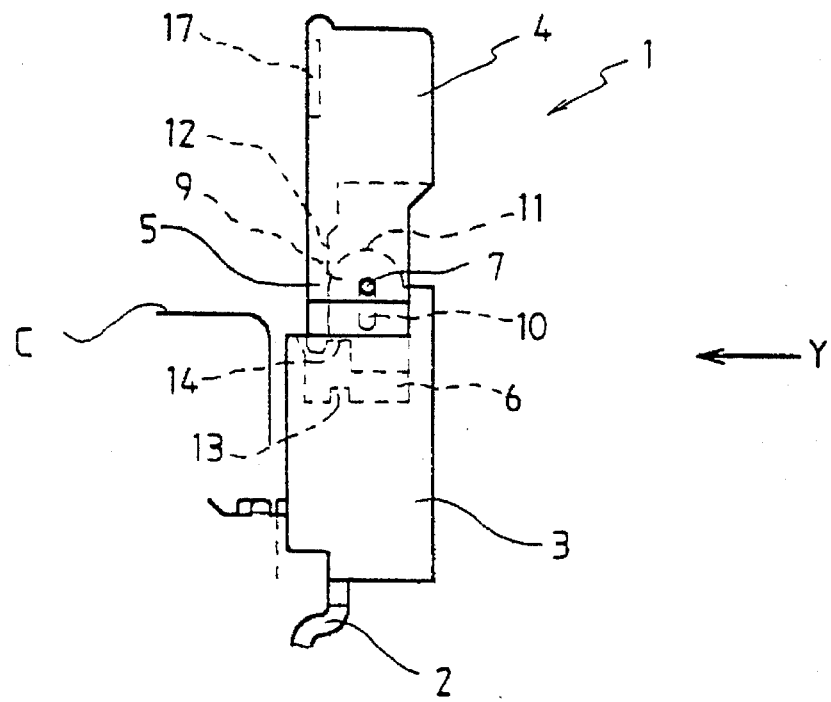
FIG. 3 is a front elevation view similar to FIG. 1, but showing the eject button in a raised position.
Figure 4:
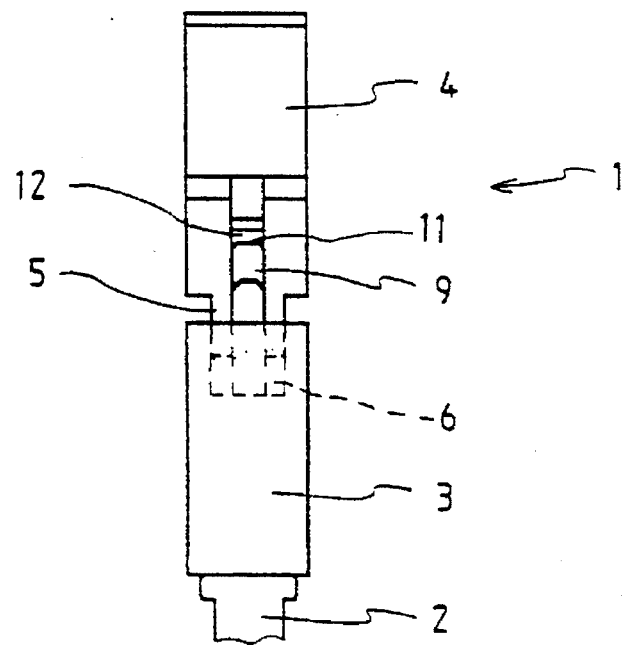
FIG. 4 is an illustration of the preferred embodiment of the card eject mechanism as viewed in the direction of arrow Y in FIG. 3.

Operation button 4 has a base portion 5 pivotally connected to base button 3 by a pivot pin 7 located within an elongated hole 10 formed through a support portion 9 of base button 3. Elongated hole 10 extends along the direction of insertion and ejection of the card. Base button 3 is also formed with a receptacle recess 6 for pivotally accommodating operation button 4. With the construction as set forth above, when operation button 4 is in the raised position in axial alignment with base button 3, base portion 5 of operation button 4 is aligned with receptacle recess 6 of base button 3 (FIG. 3). Then, by depressing operation button 4 so it moves along elongated hole 10, base portion 5 of operation button 4 engages receptacle recess 6 to fix operation button 4 to base button 3. By engagement of base portion 5 and operation button receptacle recess 6, operation button 4 can be fixed in the raised position.

A marking 17 is provided on the side edge of operation button 4 for identifying the operation button in the raised position or in the folded position. While the marking 17 is provided on the side edge of operation button 4 to indicate the folded position in the shown embodiment, the marking could be provided on the front end of operation button 4 to indicate the raised position.

Next, the operation of the card eject mechanism will be discussed with reference to FIGS. 5 to 9.

Figure 5:
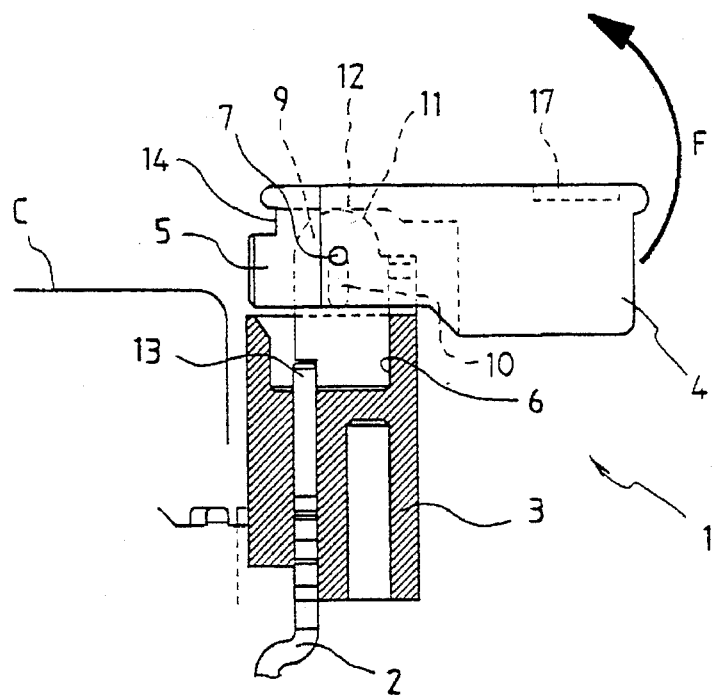
FIG. 5 is an illustration showing the first step in operation of the eject button.
Figure 6:
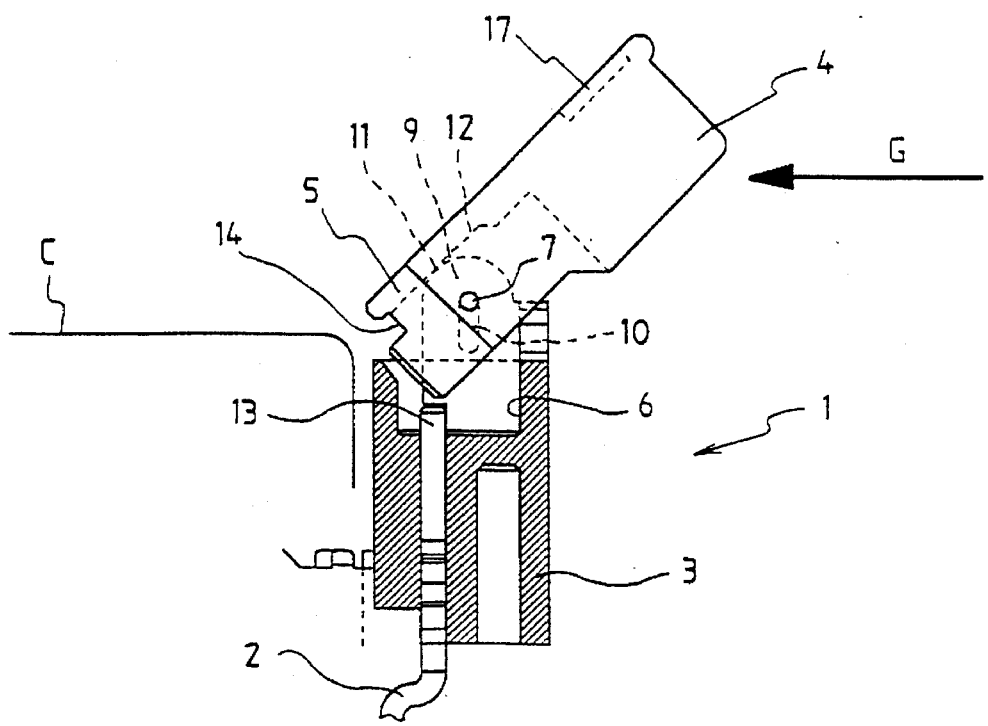
FIG. 6 is an illustration showing the second step in operation of the eject button.

The card eject button 1 of the card eject mechanism is normally in the folded position, i.e. whereat operation button 4 is perpendicular relative to base button 3, as shown in FIG. 5 and is maintained in this folded position unless and until ejection of the card is performed. In the folded position, the distance of projection of card eject button 1 from a front face of an electronic apparatus, such as a computer, is minimized to avoid inadvertent ejection of the card. In this position, a rounded end 11 of supporting portion 9 of base button 3 is held in contact with a flat surface 12 of operation button 4 to restrict pivotal movement of operation button 4 relative to base button 3.

Figure 7:
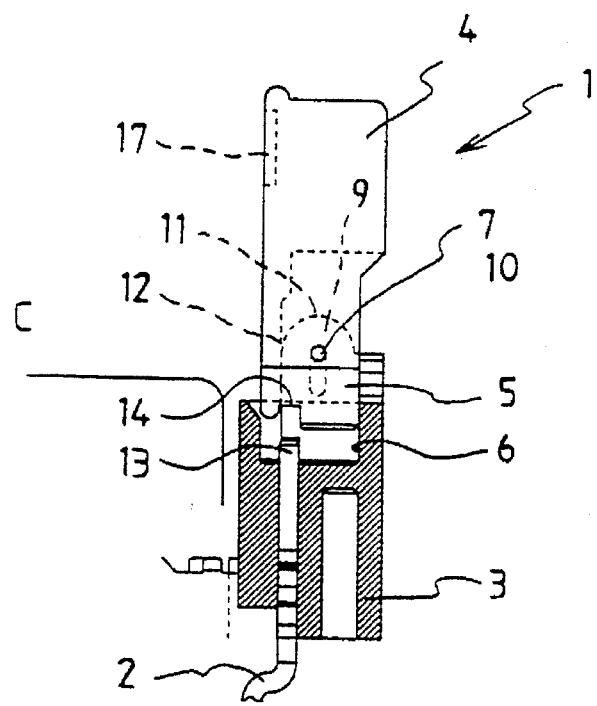
FIG. 7 is an illustration showing the third step in operation of the eject button.
Figure 8:
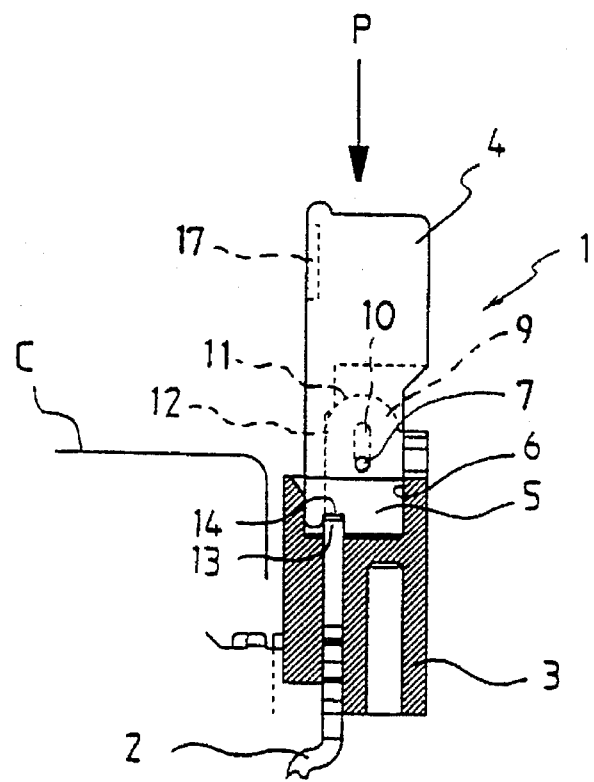
FIG. 8 is an illustration showing the fourth step in operation of the eject button.

To eject card C from the card-receiving connector, operation button 4 of eject button 1 is first pivoted in a direction indicated by arrow F in FIG. 5. At the same time, operation button 4 is laterally moved in the direction of arrow G in FIG. 6. Operation button 4 is then placed in axial alignment with base button 3 and thus in the raised position as shown in FIG. 7. In this position, a force P is applied to operation button 4 in the stroke or card insertion direction, as shown in FIG. 8, and pivot pin 7 moves axially within elongated hole 10. Base portion 5 of operation button 4 then engages receptacle recess 6 of base button 3. Thus, operation button 4 is therefore secured to base button 3 and fixed in the raised position. An eject rod accommodating recess 14 formed on one end of operation button 4 is aligned with and engages a corresponding end of eject rod 2 for fixing operation button 4 in the raised position.

Figure 9:
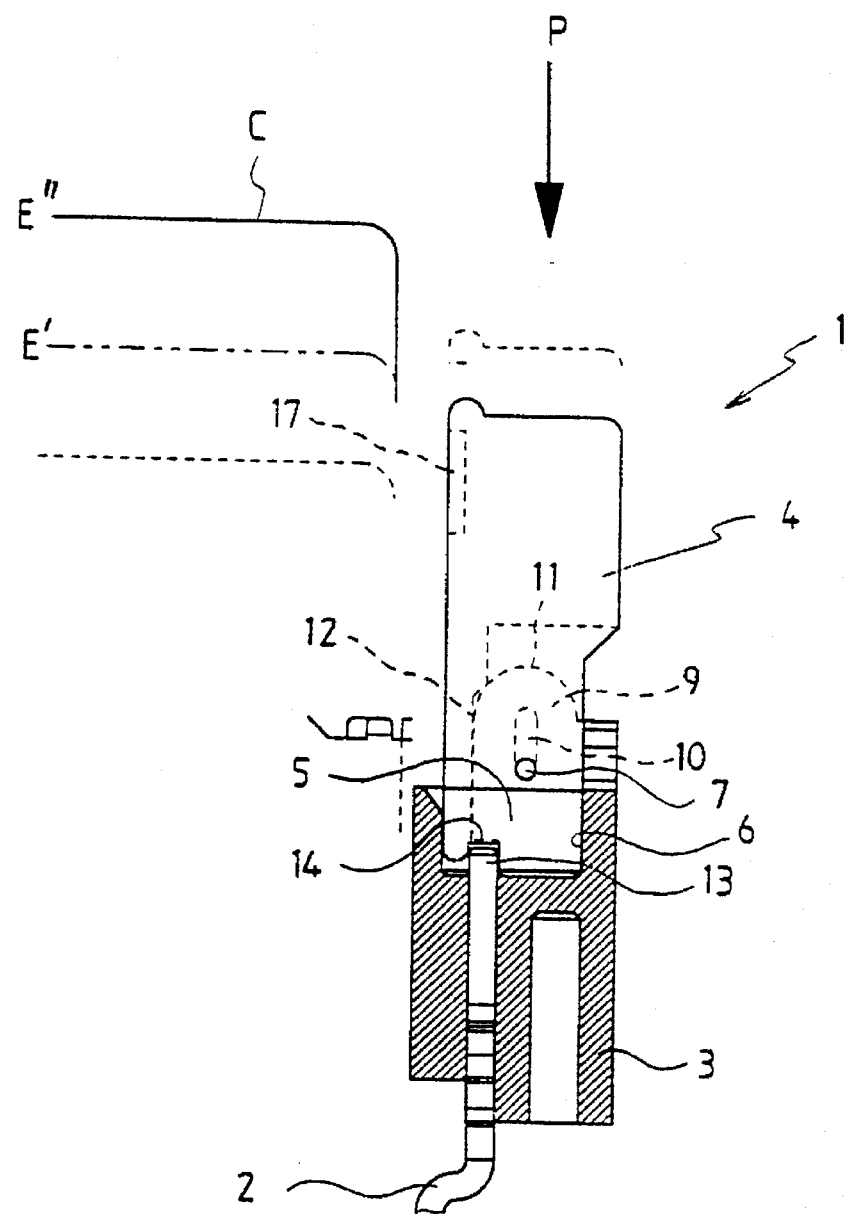
FIG. 9 is an illustration showing the fifth step in operation of the eject button.

By further applying a force to operation button 4 as shown in FIG. 9, base button 3, eject rod 2 and operation button 4 move in the card insertion direction to actuates the actuation lever and eject card C and move the card to the position shown by line E' in FIG. 9. The operation button may be further depressed until the card C is completely ejected as shown by line E". At the eject position of E', the card can be manually removed from the card-receiving connector. After completion of ejection, eject button 1 may be locked in the fully depressed position by a known lock mechanism.

When card C is to be used, the card is inserted into a card slot in the card-receiving connector. At the end of the insertion stroke of the card, whereat the terminals of the card are electrically connected with the terminals of the header of the card-receiving connector, eject button 1 is released from its locking position to allow it to return to the perpendicular position shown in FIG. 5 through a process opposite to that described above with respect to the card ejecting operation.

Figure 10:
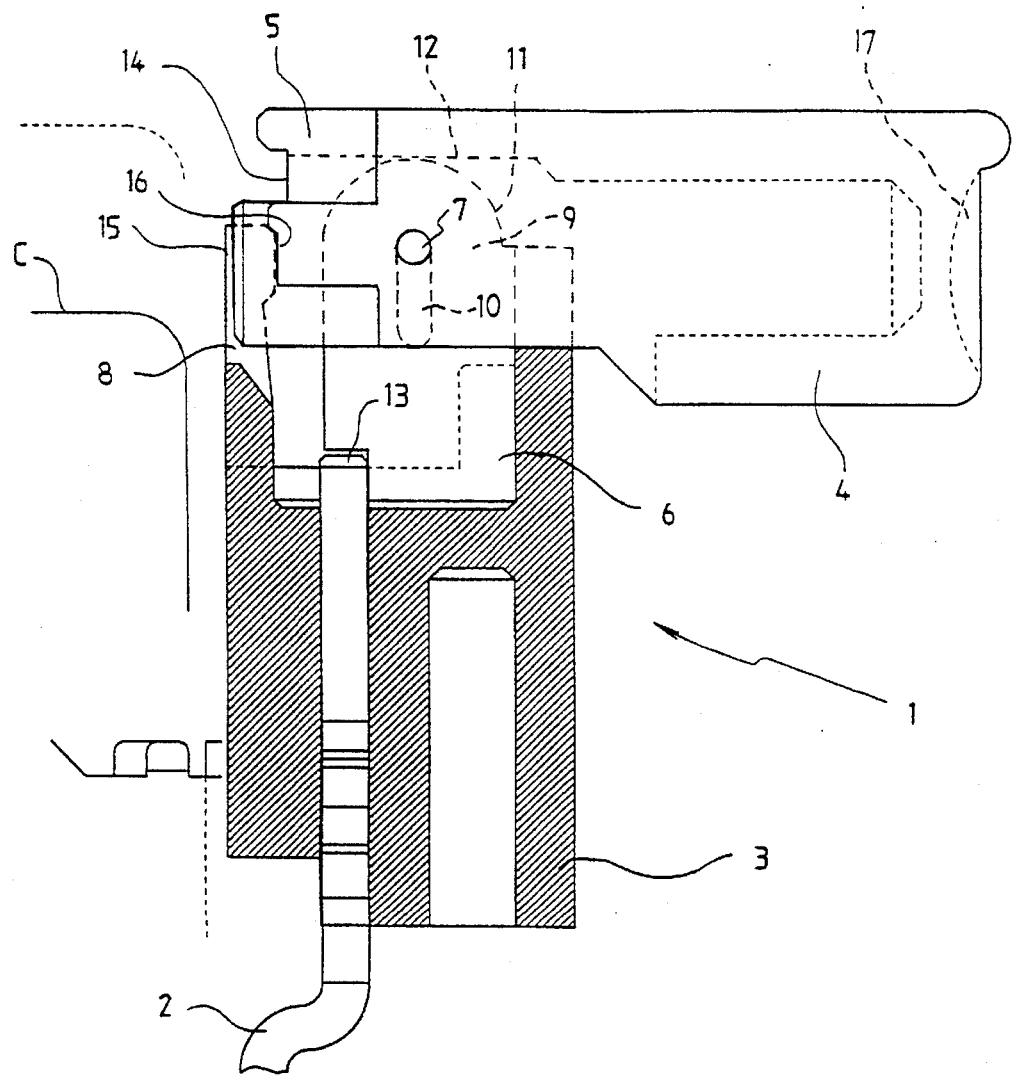
FIG. 10 is an illustration of a second embodiment of the eject button according to the present invention.
Figure 11:
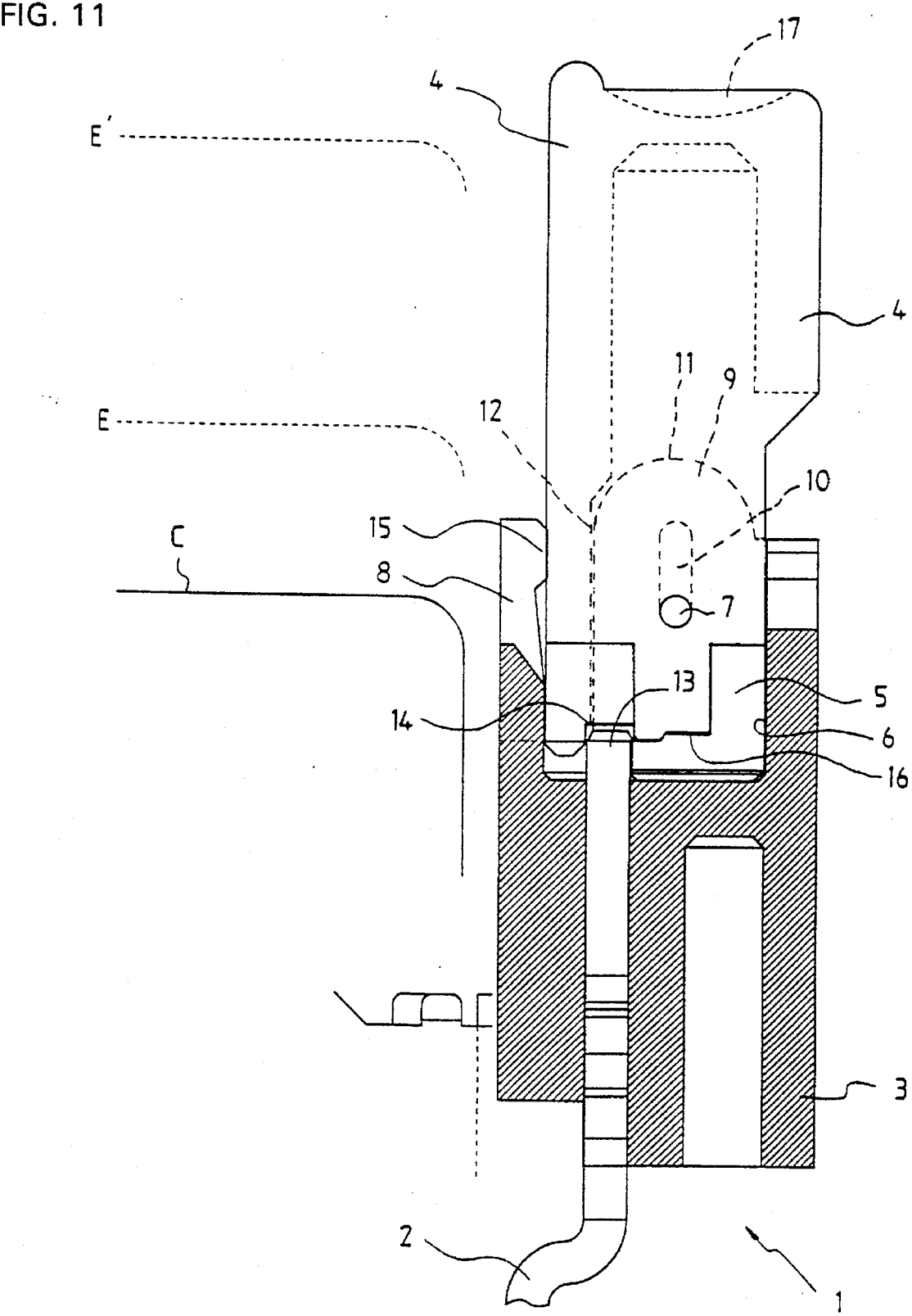
FIG. 11 is an illustration of the second embodiment of the eject button in the raised position.

FIGS. 10 and 11 show a second embodiment of the card eject mechanism according to the present invention.

The second embodiment of the invention differs from the above-described embodiment primarily due to the presence of an elastically deformable lock arm 8. The lock arm 8 is formed integrally with base button 3 and is designed for locking operation button 4 in its raised position and its folded position. As seen in FIG. 10, operation button 4 is formed with a recess 16 which corresponds to a locking end 15 of the lock arm 8. Therefore, when locking end 15 engages recess 16 of operation button 4, operation button 4 is positively fixed in the folded position. On the other hand, in the raised position (FIG. 11), locking end 15 of lock arm 8 contacts the side surface of the operation button 4 for restricting pivotal motion of operation button 4. The cantilevered construction of lock arm 8 may provide a "click" or tactile feedback sensation during pivoting of operation button 4 of eject button 1.

In addition, as can be seen in FIGS. 10 and 11, marking 17 is located at the front end for indicating the raised position of operation button 4.

With the construction set forth above, since the base button and the operation button of the eject button are pivotally connected to one another, and since the operation button engages the base button to form a rigid straight lever together with the eject rod, no additional components are necessary. Therefore, the present invention simplifies the construction of the card eject mechanism. Furthermore, the simplified construction allows for miniaturization of the card eject mechanism and thus for miniaturizing the entire card-receiving connector.

Furthermore, by using a lock arm, such as lock arm 8 the operation button can be positively locked in either the raised position or the folded position. Furthermore, since the lock arm may provide tactile feedback during pivoting the operation button relative to the base button, additional components such as springs which heretofore were used to provide tactile feedback, are unnecessary. Therefore, the number of parts required for the card eject mechanism is reduced to further simplify the structure.

Although the invention has been illustrated and described, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

We claim:

1. An eject mechanism for a card-receiving connector including an eject rod, an eject button connected to said eject rod and an actuation lever operatively associated with an end of said eject button for ejecting a card from said card receiving connector, comprising:

said eject button including a base button and an operation button;

said operation button being pivotally connected to said base button for moving between a raised position where said operation button is axially aligned with said base button and a folded position where said operation button is oriented generally perpendicular to said base button, wherein said base button includes a recess for receiving a corresponding base portion of said operation button only where said operation button is in said raised position.

2. An eject mechanism as set forth in claim 1, wherein said base button of said eject button further includes a lock arm for holding said operation button in said folded and raised positions.

3. An eject mechanism as set forth in claim 2, wherein said base button is integrally formed with said eject rod and said operation button is pivotally connected to the base button by a pivot pin mounted within an elongated slot.

4. An eject mechanism for a card-receiving connector comprising:

an eject rod mounted for movement generally alongside the card-receiving connector;

an eject button assembly operatively associated with said eject rod for transmitting a force to said eject rod upon manual depression of said eject button assembly, said eject button assembly including a first member fixed to said eject rod in axial alignment therewith and a second member pivotable relative to said first member between an active position for permitting transmission of the force and a resting position whereat said second member is generally perpendicular to said first member for avoiding inadvertent ejection of the card wherein said first member includes a recess for receiving a complementary portion of said second member when said second member is in the active position; and a lock arm integrally formed on said first member for locking said second member in said active position.

5. An eject mechanism as set forth in claim 4, wherein said first and second members are pivotally connected through a mechanism which permits pivotal movement of said second member relative to said first member and axial movement of said second member relative to said first member.

6. An eject mechanism as set forth in claim 5, further comprising holding means including first means active when said second member is in said active position and axially moved toward said first member for allowing movement of the first and second members as an integral button assembly.

7. An eject mechanism as set forth in claim 6, wherein said holding means further includes a second means active when said second member is in said resting position for restricting pivotal motion of said second member relative to the first member.

8. An eject mechanism as set forth in claim 4, wherein the lock arm locks locking said second member in said resting position.

* * * * *